United States Patent
Clapp et al.

(10) Patent No.: US 9,732,239 B2
(45) Date of Patent: Aug. 15, 2017

(54) UV-CURABLE SILICONE COMPOSITION, CURED PRODUCTS THEREOF, AND METHODS OF USING THE SAME

(71) Applicant: Dow Corning Corporation, Midland, MI (US)

(72) Inventors: Terry Clapp, Hertfordshire (GB); Jonathan Hannington, Midland, MI (US); Bianxiao Zhong, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 0 days.

(21) Appl. No.: 15/027,076

(22) PCT Filed: Oct. 22, 2014

(86) PCT No.: PCT/US2014/061678
§ 371 (c)(1),
(2) Date: Apr. 4, 2016

(87) PCT Pub. No.: WO2015/069454
PCT Pub. Date: May 14, 2015

(65) Prior Publication Data
US 2016/0244625 A1  Aug. 25, 2016

Related U.S. Application Data

(60) Provisional application No. 61/902,584, filed on Nov. 11, 2013.

(51) Int. Cl.
*C09D 11/101* (2014.01)
*B41J 11/00* (2006.01)
(Continued)

(52) U.S. Cl.
CPC .......... *C09D 11/101* (2013.01); *B41J 11/002* (2013.01); *C08F 283/124* (2013.01);
(Continued)

(58) Field of Classification Search
None
See application file for complete search history.

(56) References Cited

U.S. PATENT DOCUMENTS

| 4,052,529 A | 10/1977 | Bokerman et al. |
| 5,162,389 A | 11/1992 | Lee et al. |

(Continued)

OTHER PUBLICATIONS

Evonik, Aerosil—Fumed Silica Technical Overview, Dec. 2015.*

*Primary Examiner* — An Do
*Assistant Examiner* — Renee I Wilson
(74) *Attorney, Agent, or Firm* — Matthew T. Fewkes

(57) ABSTRACT

Various embodiments disclosed related to UV-curable silicone composition, cured products thereof, and methods of using the same. Various embodiments provide a shear-thinning UV-curable silicone composition. The composition can include (A) a mercapto-functional polyorganosiloxane having the unit formula $[(CH_3)_3SiO_{1/2}]_x[(CH_3)_2SiO]_y[R(CH_3)SiO]_z$ wherein x is about 0.01 to about 0.1, y is about 0 to about 0.94, z is about 0.05 to about 0.99, and at each occurrence R is independently a mercapto($C_{1-30}$)hydrocarbyl group. The composition can include (B) at least one of (B1) a polyorganosiloxane comprising at least two aliphatic unsaturated carbon-carbon bonds, and (B2) an organic molecule comprising at least two aliphatic unsaturated carbon-carbon bonds; the composition can include (C) a filler. The composition can also include (D) a photoinitiator.

16 Claims, 4 Drawing Sheets

(51) Int. Cl.
*C09D 11/30* (2014.01)
*C09D 151/08* (2006.01)
*C08F 283/12* (2006.01)
*C08F 290/06* (2006.01)
*C09D 11/102* (2014.01)
*C08L 83/06* (2006.01)
*B41J 2/01* (2006.01)
*C08G 77/28* (2006.01)
*C08G 77/20* (2006.01)

(52) U.S. Cl.
CPC .......... *C08F 290/068* (2013.01); *C08L 83/06* (2013.01); *C09D 11/102* (2013.01); *C09D 11/30* (2013.01); *C09D 151/085* (2013.01); *B41J 2/01* (2013.01); *C08G 77/20* (2013.01); *C08G 77/28* (2013.01); *C08L 2312/06* (2013.01)

(56) References Cited

U.S. PATENT DOCUMENTS

| | | |
|---|---|---|
| 8,507,618 B2 | 8/2013 | Schaefer et al. |
| 8,716,362 B2 | 5/2014 | Ono et al. |
| 8,865,787 B2 | 10/2014 | Sakamoto et al. |
| 2013/0042973 A1* | 2/2013 | Sakamoto .............. C08K 5/548 156/275.5 |

\* cited by examiner

Steady shear viscosity sweep at 25 C for sample Ex 4-1.

FIG. 1a illustrates the viscosity versus shear rate of a curable silicone composition, in accordance with various embodiments.

Steady shear viscosity sweep at 25 C for sample Ex 4-2.

UV-CURABLE SILICONE COMPOSITION, CURED PRODUCTS THEREOF, AND METHODS OF USING THE SAME

CROSS REFERENCE TO RELATED APPLICATIONS

This application is a U.S. national stage filing under 35 U.S.C. §371 of PCT Application No. PCT/US14/061678 filed on 22 Oct. 2014, currently pending, which claims the benefit of U.S. Provisional Patent Application No. 61/902,584 filed 11 Nov. 2013 under 35 U.S.C. §119 (e). PCT Application No. PCT/US14/061678 and U.S. Provisional Patent Application No. 61/902,584 are hereby incorporated by reference.

BACKGROUND OF THE INVENTION

Curable compositions including organopolysiloxanes can be subjected to a curing process to form a reaction product of the organopolysiloxane, e.g., a cured product. In some examples, the reaction product or the organopolysiloxane itself can have properties well-suited for a variety of applications, including use in cosmetics, deodorant, food, and soaps, and other applications including waveguides, sealants, coatings, lubricants, fire-resistant materials, defoamers, pharmaceutical additives, structural products for plumbing and building construction, toys, paints, and membranes that can be used for separations.

Printing techniques can apply a substance to a substrate in a controlled pattern. When printing techniques are used to apply curable materials, the printed substrate can be subjected to a curing process. However, curable organopolysiloxane compositions have been generally unsuitable for printing, due to at least one of insufficient shear-thinning properties, insufficient transparency of the cured product, inconveniently slow curing time, difficulty of controlling dimensions of cured material, and unsuitability for efficient and effective use with various printing techniques such as screen printing, flexographic printing, jet dispensing, or ink jet printing.

SUMMARY OF THE INVENTION

In various embodiments, the present invention provides a shear-thinning ultra violet (UV)-curable silicone composition. The composition includes (A) a mercapto-functional polyorganosiloxane having the unit formula $[(CH_3)_3SiO_{1/2}]_x[(CH_3)_2SiO]_y[R(CH_3)SiO]_z$. The variable x is about 0.01 to about 0.1, y is about 0 to about 0.94, and z is about 0.05 to about 0.99. At each occurrence R is independently a mercapto($C_{1-30}$)hydrocarbyl group. The composition includes (B), which is at least one of (B1) a polyorganosiloxane including at least two aliphatic unsaturated carbon-carbon bonds, and (B2) an organic molecule including at least two aliphatic unsaturated carbon-carbon bonds. The composition includes (C) a filler. The composition also includes (D) a photoinitiator. In some embodiments, the present invention provides a cured product of the curable silicone composition. In some embodiments, the present invention provides methods of using the curable composition or the cured product thereof, and devices including the curable composition or the cured product thereof.

In various embodiments, the present invention provides a method of ink-jet printing. The method includes obtaining or providing a printable composition. The composition includes (A) a mercapto-functional polyorganosiloxane having the unit formula $[(CH_3)_3SiO_{1/2}]_x[(CH_3)_2SiO]_y[R(CH_3)SiO]_z$. The variable x is about 0.01 to about 0.1, y is about 0 to about 0.94, and z is about 0.05 to about 0.99. At each occurrence R is independently a mercapto($C_{1-30}$)hydrocarbyl group. The composition includes (B), which is at least one of (B1) a polyorganosiloxane including at least two aliphatic unsaturated carbon-carbon bonds, and (B2) an organic molecule including at least two aliphatic unsaturated carbon-carbon bonds. The composition also includes (D) a photoinitiator. The method includes printing the printable composition onto a substrate with an ink-jet printer. The method includes curing the printed printable composition.

In various embodiments, the present invention provides a shear-thinning UV-curable silicone composition. The composition includes (A) a mercapto-functional polyorganosiloxane having the unit formula $[(CH_3)_3SiO_{1/2}]_x$ $[(CH_3)_2SiO]_y[R(CH_3)SiO]_z$. The variable x is about 0.01 to about 0.1, y is about 0 to about 0.94, and z is about 0.05 to about 0.99. At each occurrence R is a mercaptopropyl group. Component (A) is present in the composition at about 40 wt % to about 85 wt %. The composition includes (B), which is at least one of (B1) a polyorganosiloxane including at least two aliphatic unsaturated carbon-carbon bonds, and (B2) an organic molecule including at least two aliphatic unsaturated carbon-carbon bonds. Component (B) is present in the composition at about 10 wt % to about 60 wt %. The composition includes (C) a filler including fumed silica having a primary particle size of about 5-100 nm. The filler is substantially transparent to light having wavelengths of about 280 nm to about 400 nm. The filler has a refractive index of about 1.44 to about 1.48 and 633 nm at standard temperature and pressure. Component (C) is present in the composition at about 1 wt % to about 40 wt %. The composition includes (D) a UV photoinitiator. Component (D) is present in the composition at about 0.5 wt % to about 5 wt %. The viscosity of the composition decreases as shear rate increases. The composition is shear-thinning and UV-curable, and the composition has a refractive index of about 1.44 to about 1.48 and 633 nm at standard temperature and pressure. In some embodiments, the present invention provides a cured product of the curable silicone composition. In some embodiments, the present invention provides methods of using the curable composition or the cured product thereof, and devices including the curable composition or the cured product thereof.

Various embodiments of the present invention have certain advantages, at least some of which are unexpected, over other curable silicone compositions, cured products of the same, and methods of using the same. For example, in various embodiments, the curable polysiloxane composition can UV-cure more quickly and more efficiently than other curable polysiloxane compositions including UV-curable compositions. In various embodiments, the curable polysiloxane composition can be more optically transparent in an uncured form than other compositions such as curable polysiloxane compositions including fillers. In various embodiments, the curable polysiloxane composition can be more optically transparent in a cured form than other cured compositions such as cured polysiloxane compositions including fillers. In some embodiments, the curable silicone composition has better shear-thinning properties than other curable compositions such as curable silicone compositions, and is optically transparent before and after cure, making the composition more suitable for printing using various printing techniques, such as screen printing, flexographic printing, or ink jet printing. In some embodiments, the curable silicone composition can be used in applications requiring optical transparency more effectively than other compositions. In some embodiments, the dimensions of the cured product of the curable polysiloxane composition are easier to control than those of the cured product of other curable compositions such as curable polysiloxane compositions.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1A:
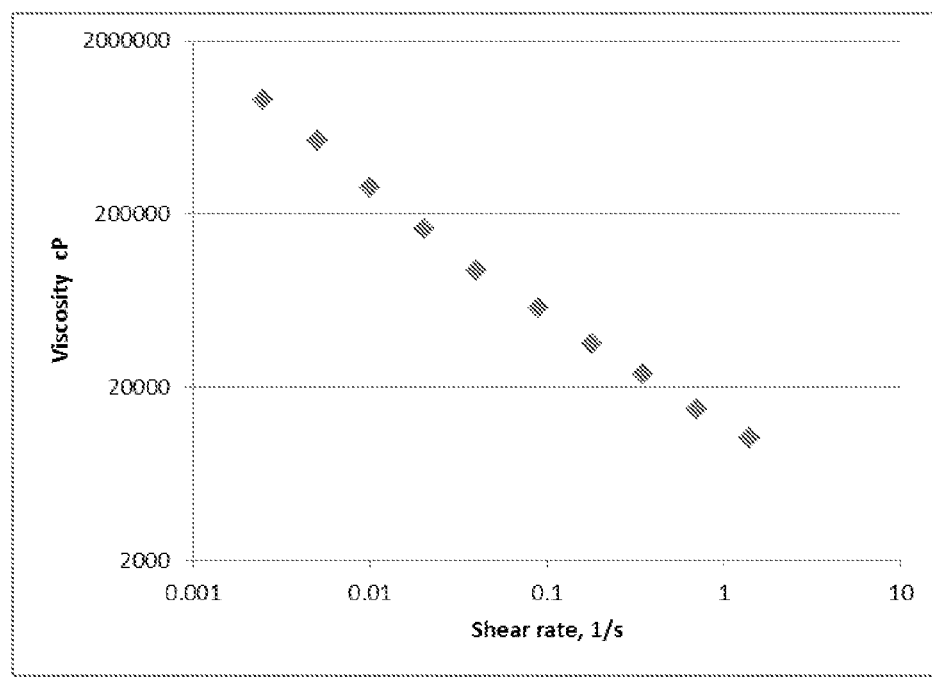
FIG. 1a illustrates the viscosity versus shear rate of a curable silicone composition, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "alkoxy" as used herein refers to an oxygen atom connected to an alkyl group, including a cycloalkyl group, as are defined herein.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation.

The term "UV light" as used herein refers to ultraviolet light, which is electromagnetic radiation with a wavelength of about 10 nm to about 400 nm. In the context of UV curing wavelengths can be selected from, for example, the UVA and UVB wavebands located between 280 nm and 400 nm The term "cure" as used herein refers to exposing to radiation in any form, heating, or allowing to undergo a physical or chemical reaction that results in hardening or an increase in viscosity.

The term "solvent" as used herein refers to a liquid that can dissolve a solid, liquid, or gas. Nonlimiting examples of solvents are silicones, organic compounds, water, alcohols, ionic liquids, and supercritical fluids.

The term "silica" as used herein refers to silicon dioxide (SiO$_2$) of any particle size, shape, particle size distribution, shape distribution and surface functionality, including chemically treated silicas. It can also refer to a polysiloxane that includes a silicon and oxygen atom network, including at least in part a silicon-oxygen-silicon (silicon atom bonded to oxygen atom bonded to silicon atom) network, wherein the compound can be a polymer of any length or degree of branching. In various embodiments, the network can terminate with an Si=O group, or an Si—OH group. The silica can include polysiloxanes in 30%, 50%, 80%, 90%, 95%, 99%, 99.5%, 99.9%, or in any suitable percent composition (wt %).

The term "room temperature" as used herein refers to a temperature of about 15° C. to 28° C.

The term "standard temperature and pressure" (STP) as used herein refers to 20° C. and 101 kPa.

The term "mil" as used herein refers to a thousandth of an inch, such that 1 mil=0.001 inch.

Shear-Thinning UV-Curable Silicone Composition and Cured Products Thereof.

In various embodiments, the present invention provides a shear-thinning UV-curable silicone composition. The viscosity of the composition can decrease as a shear applied to the composition increases. The shear-thinning property of the composition can make the composition suitable for use with a variety of methods, such as printing methods.

The curable silicone composition can be substantially optically clear, such that at least about 40% of visible light is transmitted through the composition, or such that at least about 45%, 50, 60, 65, 70, 75, 80, 85, 90, 95, 96, 97, 98, 99, 99.9, 99.99, or about 99.999% or more of visible light is transmitted through the composition. The curable silicone composition can have any suitable refractive index, such as a refractive index of about 1.43 to about 1.55 at 633 nm at standard temperature and pressure, or about 1.44 to about 1.48, or about 1.43 or less, or about 1.44, 1.45, 1.46, 1.47, 1.48, 1.49, 1.50, 1.51, 1.52, 1.53, 1.54, or about 1.55 or more.

In some embodiments, the present invention provides a method of making the curable silicone composition, including obtaining or providing a mixture of part I and part II. Part I includes a substantially viscosity-stable pre-mix including the components (A), (C), and (D), such that the viscosity at a given shear rate is substantially constant over time, e.g., Part I can age with substantially no detrimental effect on the viscosity. Part II includes component (B). In some embodiments, the method includes mixing component (A) and component (C) with suitable heating under a vacuum. In some embodiments, Part I and Part II can be stored separately for an extended time, such as at least about 0.5 year, 1 year, 2, 3, 4, 5, 6, 7, 8, 9, or about 10 years or more.

In various embodiments, the present invention provides a cured product of the curable composition. The cured product can be substantially optically clear, such that at least about 40% of visible light is transmitted through the composition, or such that at least about 45%, 50, 60, 65, 70, 75, 80, 85, 90, 95, 96, 97, 98, 99, 99.9, 99.99, or about 99.999% or more of visible light is transmitted through the composition. The cured silicone composition can have any suitable refractive index, such as a refractive index of about 1.43 to about 1.55 at 633 nm at standard temperature and pressure, or about 1.44 to about 1.48, or about 1.43 or less, or about 1.44, 1.45, 1.46, 1.47, 1.48, 1.49, 1.50, 1.51, 1.52, 1.53, 1.54, or about 1.55 or more.

In various embodiments, the curable polysiloxane composition can UV-cure more quickly and more efficiently than other curable polysiloxane compositions including UV-curable compositions. In some embodiments, the curable polysiloxane composition can UV-cure in about 5 seconds, 10 s, 15, 20, 25, 30, 35, 40, 45, 50, 55 seconds, 1 minute, 1.5, 2, 2.5, 3, 3.5, 4, 4.5, 5, 6, 7, 8, 9, 10, 12, 14, 16, 18, 20, 25, 30, 35, 40, 45, 50, 55 minutes, 1 hour, 1.5, 2, 3, 4, 5, 10, 15, 20 hours, 1 day, 1.5, 2, 3, 4 days, or about 5 days. In some embodiments, the curable polysiloxane composition can UV-cure with 300 mJ/cm² UV-radiation in about 0.1 seconds, 0.5 s, 1, 2, 3, 4, 5, 6, 7, 8, 9, 10, 15, 20, 25, 30, 35, 40, 45, 50, 55 seconds, 1 minute, 1.5, 2, 2.5, 3, 3.5, 4, 4.5, 5, 6, 7, 8, 9, 10, 12, 14, 16, 18, 20, 25, 30, 35, 40, 45, 50, 55 minutes, or about 1 hour or more. Any suitable amount of irradiation can be used to cure the composition, such as about 50 mJ/cm² to about 3000 mJ/cm², or about 300 mJ/cm² to about 1200 mJ/cm², or about 50 mJ/cm² or less, or about 100 mJ/cm², 150, 200, 250, 300, 350, 400, 450, 500, 550, 600, 650, 700, 750, 800, 850, 900, 950, 1000, 1050, 1100, 1150, 1200, 1400, 1600, 1800, 2000, 2200, 2400, 2600, 2800, or about 3000 mJ/cm² or more.

The shear-thinning property of the composition can be any suitable shear thinning. The shear-thinning property of the composition, as used herein, refers to the property of various embodiments wherein the composition exhibits a reduction in viscosity when a shearing action is applied and an increase in viscosity upon subsequent rest. For example, with a shear rate of about 0 $s^{-1}$, a shear rate increase of about 0.001 $s^{-1}$ or less, or about 0.001 to about 0.01, about 0.01 to about 0.1, about 0.1 to about 1, about 1 to about 10, about 10 to about 100, or about 100 to about 1000 $s^{-1}$, can result in a decrease in viscosity of the composition of about 0.001% or less, or about 0.01%, 0.1, 1, 2, 3, 4, 5, 6, 8, 10, 10, 12, 14, 16, 18, 20, 25, 30, 35, 40, 45, 50, 55, 60, 65, 70, 75, 80, 85, 90, 95, 100, 125, 150, 175, 200, 250, 300, 350, 400, 450, 500, 750, 1000, 5000, or of about 10,000% or more. For example, with a shear rate of about 0.001 $s^{-1}$ or less, or about 0.001 to about 0.01, about 0.01 to about 0.1, about 0.1 to about 1, about 1 to about 10, about 10 to about 100, or about 100 to about 1000 $s^{-1}$, a shear rate increase of about 1% or less, or about 2%, 3, 4, 5, 6, 8, 10, 12, 14, 16, 18, 20, 25, 30, 35, 40, 45, 50, 55, 60, 65, 70, 75, 80, 85, 90, 95, 100, 125, 150, 175, 200, 250, 300, 350, 400, 450, 500, 750, 1000, 5000, or of about 10,000% can result in a decrease in viscosity of the composition of about 0.001% or less, or about 0.01%, 0.1, 1, 2, 3, 4, 5, 6, 8, 10, 10, 12, 14, 16, 18, 20, 25, 30, 35, 40, 45, 50, 55, 60, 65, 70, 75, 80, 85, 90, 95, 100, 125, 150, 175, 200, 250, 300, 350, 400, 450, 500, 750, 1000, 5000, or of about 10,000% or more. Likewise, a rate decrease of about 1% or less, or about 2%, 3, 4, 5, 6, 8, 10, 12, 14, 16, 18, 20, 25, 30, 35, 40, 45, 50, 55, 60, 65, 70, 75, 80, 85, 90, 95, 100, 125, 150, 175, 200, 250, 300, 350, 400, 450, 500, 750, 1000, 5000, or of about 10,000% can result in an increase in viscosity of the composition of about 0.001% or less, or about 0.01%, 0.1, 1, 2, 3, 4, 5, 6, 8, 10, 10, 12, 14, 16, 18, 20, 25, 30, 35, 40, 45, 50, 55, 60, 65, 70, 75, 80, 85, 90, 95, 100, 125, 150, 175, 200, 250, 300, 350, 400, 450, 500, 750, 1000, 5000, or of about 10,000% or more. In various embodiments, once the application of shear has decreased or stopped, the viscosity can decrease or recover quickly. For example, after the application of shear has decreased or stopped, the viscosity of composition can recover and equilibrate to a higher viscosity in less than about 0.1 seconds, or in about 0.000.1 seconds or less, or in about 0.001 s, 0.01, 0.1, 1, 2, 3, 4, or in about 5 seconds or more. In some embodiments, under a low stress, the composition can have sufficient yield stress that the composition does not flow or begin to shear thin.

Component (A), Mercapto-Functional Polyorganosiloxane.

The curable silicone composition can include a mercapto-functional polyorganosiloxane. Any suitable proportion of the curable composition can be the mercapto-functional polyorganosiloxane, such as about 25 wt % to about 90 wt %, about 50 wt % to about 85 wt %, or about 25 wt % or less, or about 30 wt %, 35, 40, 45, 50, 55, 60, 65, 70, 75, 80, 85, or about 90 wt % or more.

The mercapto-functional polyorganosiloxane can have the average unit formula $[(CH_3)_3SiO_{1/2}]_x[(CH_3)_2SiO]_y[R$ $(CH_3)SiO]_z$, wherein at each occurrence R is independently a mercapto($C_{1-30}$)hydrocarbyl group. The subscripts x, r, and z can have any suitable values, such that the curable composition has the properties described herein. For example, x can be about 0.02 to about 0.05, or about 0.025 to about 0.04, or about 0.02 or less, or about 0.022, 0.024, 0.026, 0.028, 0.030, 0.032, 0.034, 0.036, 0.038, 0.040, 0.042, 0.044, 0.046, 0.048, or about 0.05 or more. For example, y can be about 0 to about 0.9, or about 0.4 to about 0.8, or about 0, 0.05, 0.1, 0.15, 0.2, 0.25, 0.3, 0.35, 0.4, 0.45, 0.5, 0.55, 0.6, 0.65, 0.7, 0.75, 0.8, 0.85, or about 0.9 or more. For example, z can be about 0.08 to about 0.98, or about 0.2 to about 0.4, or about 0.08 or less, or about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or about 0.98 or more. In some embodiments, the mercapto-functional polyorganosiloxane has the unit formula $[(CH_3)_3SiO_{1/2}]_{0.03}[(CH_3)_2SiO]_{0.64}[R(CH_3)SiO]_{0.33}$.

The variable R can be any suitable mercapto($C_{1-30}$)hydrocarbyl group. In some embodiments, at each occurrence R is independently a mercapto($C_1$-$C_{30}$)alkyl group. At each occurrence R can be independently a mercapto($C_1$-$C_{10}$)alkyl group. In some embodiments, R can be mercapto propyl, HS—$(CH_2)_3$—.

In some embodiments, the organopolysiloxane has a number average molecule weight of about 500 g/mol to 20,000 g/mol, in some examples, the organopolysiloxane has a number average molecular weight of about 1,000 g/mol to 10,000 g/mol, about 1,000 g/mol TO about 4,000 g/mol, about 1,000 g/mol or less, or about 1,500, 2,000, 2,500, 3,000, 3,500, 4,000, 4,500, 5,000, 6,000, 7,000, 8,000, 9,000, 10,000, 12,000, 14,000, 16,000, 18,000, or about 20,000 g/mol or more.

In descriptions of average unit formula, the subscripts are mole fractions. For the average unit formula:

$(R^1R^4R^5SiO_{1/2})_w(R^1R^4SiO_{2/2})_x(R^4SiO_{3/2})_y(SiO_{4/2})_z$, the variables $R^1$, $R^4$, and $R^5$ can independently vary between individual siloxane formula units. Alternatively, the variables $R^1$, $R^4$, and $R^5$ can independently be the same between individual siloxane formula units. For example, average unit formula above can include the following average unit formula:

$(R^1R^4R^5SiO_{1/2})_w(R^{1a}R^4SiO_{2/2})_{x1}(R^{1b}R^4SiO_{2/2})_{x2}(R^4SiO_{3/2})_y(SiO_{4/2})_z$ wherein subscripts x1+x2=x, and where $R^{1a}$ is not equal to $R^{1b}$. Alternatively, $R^{1a}$ can be equal to $R^{1b}$.

Component (B), Compound Including at Least Two Aliphatic Unsaturated Carbon-Carbon Bonds.

The curable composition can include a compound including at least two aliphatic unsaturated carbon-carbon bonds. In some embodiments, the compound is (B1) a polyorganosiloxane including at least two aliphatic unsaturated carbon-carbon bonds. In some embodiments, the compound is (B2) an organic molecule including at least two aliphatic unsaturated carbon-carbon bonds. Any suitable wt % of the curable composition can be Component (B), for example, about 5 wt % to about 75 wt %, about 10 wt % to about 60 wt %, about 5 wt % or less, about 10, 12, 14, 16, 18, 20, 22, 24, 26, 28, 30, 32, 34, 36, 38, 40, 45, 50, 55, 60, 65, 70, or about 75 wt % or more.

The ratio of the mercapto groups in the mercapto-functional polysiloxane to the number of aliphatic unsaturated carbon-carbon bonds in component (B) is can be any suitable ratio, such that the curable composition or the cured product thereof has the properties described herein, such as about 0.25 to about 4, 0.25 or less, 0.3, 0.4, 0.6, 0.8, 1, 1.5, 2, 2.5, 3, 3.5, or about 4 or more.

Component (B1), Polyorganosiloxane Including at Least Two Aliphatic Unsaturated Carbon-Carbon Bonds.

The polyorganosiloxane including at least two aliphatic unsaturated carbon-carbon bonds can be any suitable polyorganosiloxane, such that the curable composition or the cured product thereof has the properties described herein.

The structure of the polyorganosiloxane compound can be linear, branched, cyclic, or resinous. Cyclosiloxanes can have from 3 to 12 silicon atoms, alternatively from 3 to 10 silicon atoms, alternatively from 3 to 5 silicon atoms. In acyclic polysiloxanes, the aliphatic unsaturated carbon-carbon bonds can be located at terminal, pendant, or at both terminal and pendant positions. Examples of aliphatic unsaturated carbon-carbon bond-containing groups can include alkenyl groups such as vinyl, allyl, butenyl, and hexenyl; alkynyl groups such as ethynyl, propynyl, and butynyl; or acrylate-functional groups such as acryloyloxyalkyl or methacryloyloxypropyl.

In some embodiments, Component (B1) is an organopolysiloxane of the formula $R^y_3SiO(R^y_2SiO)_\alpha(R^yR^2SiO)_\beta SiR^y_3$, (a)

$R^y_2R^4SiO(R^y_2SiO)_\chi(R^yR^4SiO)_\delta SiR^y_2R^4$, (b)

or combinations thereof.

In formula (a), α has an average value of 0 to 2000, and β has an average value of 1 to 2000. Each $R^y$ is independently halogen, hydrogen, or an organic group such as acrylate; alkyl; alkoxy; halogenated hydrocarbon; alkenyl; alkynyl; aryl; heteroaryl; and cyanoalkyl. Each $R^2$ is independently an unsaturated monovalent aliphatic carbon-carbon bond-containing group, as described herein. In formula (b), χ has an average value of 0 to 2000, and δ has an average value of 1 to 2000. Each $R^y$ is independently as defined above, and $R^4$ is independently the same as defined for $R^2$ above.

Examples of organopolysiloxanes having an average of at least two aliphatic unsaturated carbon-carbon bonds per molecule include compounds having the average unit formula $(R^1R^2R^3SiO_{1/2})_a(R^4R^5SiO_{2/2})_b(R^6SiO_{3/2})_c(SiO_{4/2})_d$ (I)

wherein each of $R^1$, $R^2$, $R^3$, $R^4$, $R^5$, and $R^6$ is an organic group independently selected from $R^y$ as defined herein, 0≤a<0.95, 0≤b<1, 0≤c<1, 0≤d<0.95, a+b+c+d=1.

In some examples, Component (B1) can include a dimethylvinyl-terminated dimethyl siloxane, dimethylvinylated and trimethylated silica, tetramethyl tetravinyl cyclotetrasiloxane, dimethylvinylsiloxy-terminated polydimethylsiloxane, trimethylsiloxy-terminated polydimethylsiloxane-polymethylvinylsiloxane copolymer, dimethylvinylsiloxy-terminated polydimethylsiloxane-polymethylvinylsiloxane copolymer, or tetramethyldivinyldisiloxane. In some examples, the vinyl groups of the structures in the preceding list can be substituted with allyl, hexenyl, acrylic, methacrylic or other hydrosilylation-reactive unsaturated groups. In some examples, Component (B1) can include an organopolysiloxane resin including $CH_2=CH(CH_3)_2SiO_{1/2}$ units, $(CH_3)_3SiO_{1/2}$ units, and $SiO_{4/2}$ units. In some examples, Component (B1) can include an oligomeric dimethylsiloxane(D)-methylvinylsiloxane($D^{vi}$)diol. In some embodiments, the polyorganosiloxane including at least two aliphatic unsaturated carbon-carbon bonds includes at least one of vinyl($C_1$-$C_5$)alkylSiO$_{1/2}$ units and vinylSiO$_{3/2}$ units.

The polyorganosiloxane including at least two aliphatic unsaturated carbon-carbon bonds can be $[(CH_2=CH)Me_2SiO_{1/2}]_{0.1-1}[(CH_2=CH)SiO_{3/2}]_{0-0.9}$. The polyorganosiloxane including at least two aliphatic unsaturated carbon-carbon bonds can be chosen from the unit formula $[(CH_2=CH)Me_2SiO_{1/2}]_{0.34}$ $[(CH_2=CH)SiO_{3/2}]_{0.66}$ and the structure $[(CH_2=CH)MeSiO_{1/2}]_4$.

Component (B2), an Organic Molecule Including at Least Two Aliphatic Unsaturated Carbon-Carbon Bonds.

The organic molecule including at least two aliphatic unsaturated carbon-carbon bonds can be any suitable polyorganosiloxane, such that the curable composition or the cured product thereof has the properties described herein. The aliphatic unsaturated carbon-carbon bonds can be alkenyl groups or alkynyl groups, for example.

The unsaturated compound can have a linear, branched, or cyclic structure. Further, in acyclic organic compounds, the unsaturated carbon-carbon bonds can be located at terminal, pendant, or at both terminal and pendant positions. Examples can include 1,4-butadiene, 1,6-hexadiene, 1,8-octadiene, and internally unsaturated variants thereof.

The organic compound can have a liquid state at standard temperature and pressure. Also, the organic compound is typically soluble in the silicone composition. The normal boiling point of the organic compound, which depends on the molecular weight, structure, and number and nature of functional groups in the compound, can vary over a wide range. In some embodiments, the organic compound can have a molecular weight less than 500, 400, or less than 300.

In some embodiments, the organic molecule including at least two aliphatic unsaturated carbon-carbon bonds is a $(C_5-C_{20})$alkyl-diene or -triene. The organic molecule including at least two aliphatic unsaturated carbon-carbon bonds can be a $(C_5-C_{20})$alkyl-diene or -triene.

Component (C), Filler.

The curable composition can include a filler. In some embodiments, the curable composition includes a filler. In other embodiments, no filler is present. In embodiments including a filler, the filler can be present as any suitable wt % of the curable composition, such as about 0.01 wt % to about 50 wt %, 1 wt % to about 40 wt %, or about 0.01 wt % or less, 0.1 wt %, 1, 2, 3, 4, 5, 6, 7, 8, 9, 10, 11, 12, 13, 14, 15, 16, 18, 20, 25, 30, 35, 40, 45, or about 50 wt % or more.

The filler can be any suitable filler, such that the curable composition or the product thereof has the properties described herein. The filler can be at least one of silica powder and ceramic glass powder. The silica powder can be at least one of fumed silica, precipitated silica, and quartz. The ceramic glass powder can be least one of soda-lime glass, low iron glass, and borosilicate glass. In some embodiments, the filler (C) is fumed silica.

The filler can have any suitable particle size, e.g., the longest dimension of the particle, such as the average longest dimension. For example, the filler can have a primary particle size of about 5 nm to about 100 nm, about 10 to about 30 nm, or about 5 nm or less, 6 nm, 8, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60, 65, 70, 75, 80, 85, 90, 95, or about 100 nm or more. As used herein, "primary" particle size refers to the actual particles in their unconglomerated state, which can optionally conglomerate to form larger "secondary" particles.

The filler can have a refractive index that substantially matches a refractive index of a mixture of components (A), (B), and (D). For example, the filler can have a refractive index of about 1.43 to about 1.55 at 633 nm at standard temperature and pressure, or about 1.44 to about 1.48, or about 1.43 or less, or about 1.44, 1.45, 1.46, 1.47, 1.48, 1.49, 1.50, 1.51, 1.52, 1.53, 1.54, or about 1.55 or more. The filler can be substantially UV-transparent, such that at least about 40% of UV light is transmitted through the filler, or such that at least about 45%, 50, 60, 65, 70, 75, 80, 85, 90, 95, 96, 97, 98, 99, 99.9, 99.99, or about 99.999% or more of light having a wavelength of about 280 nm to about 400 nm, or about 280 nm to about 315 nm, or about 315 nm to about 400 nm is transmitted through the filler.

Component (D), photoinitiator.

In various embodiments the curable silicone composition includes a photoinitiator, e.g., a UV-photoinitiator. The photoinitiator can be present as any suitable wt % of the curable composition, such as about 0.1 wt % to about 15 wt %, about 0.5 wt % to about 5 wt %, or about 0.1 wt % or less, about 1 wt %, 2, 3, 4, 5, 6, 7, 8, 9, 10, 11, 12, 13, 14, or about 15 wt % or more of the composition.

The photoinitiator can be any suitable photoinitiator, such that the curable composition or the cured product thereof has the properties described herein. For example, the photoinitiator can be at least one of benzil, a benzoin compound (e.g., a benzoin ether), a benzyl ketal, an α-dialkoxyacetophenone, an α-hydroxyalkylphenones, an α-aminoalkylphenones, an acyl-phosphine oxide, a benzophenone, a benzoamine, a thioxanthone, a thioamine, and a titanocene. The photoinitiator can be a cationic photoinitiator. In some examples, the photoinitiator can be azobisisobutyronitrile (AIBN), 2,2-dimethoxy-2-phenylacetophenone (DMPA), benzoyl peroxide, or 2-hydroxy-2-methyl-1-phenyl-1-propanone (HMPP). In some examples, the photoinitiator can benzoin, benzoin ethyl ether, benzoin methyl ether, 4,4'-dimethoxybenzoin, 4,4'-dimethylbenzil, 2-benzyl-2-(dimethylamino)-4'-morpholinobutyrophenone, 4'-tert-butyl-2', 6'-dimethylacetophenone, 2,2-diethoxyacetophenone, 2,2-dimethoxy-2-phenylacetophenone, diphenyl(2,4,6-trimethylbenzoyl)phosphine oxide/2-hydroxy-2-methylpropiophenone, 4'-ethoxyacetophenone, 3'-hydroxyacetophenone, 4'-hydroxyacetophenone, 1-hydroxycyclohexyl phenyl ketone, 2-hydroxy-4'-(2-hydroxyethoxy)-2-methylpropiophenone, 2-hydroxy-2-methylpropiophenone, 2-methyl-4'-(methylthio)-2-morpholinopropiophenone, 4'-phenoxyacetophenone, benzophenone, benzophenone-3,3',4,4'-tetracarboxylic dianhydride, 4-benzoylbiphenyl, 4,4'-bis(diethylamino)benzophenone, 4,4'-bis[2-(1-propenyl)phenoxy]benzophenone, 4-(diethylamino)benzophenone, 4,4'-dihydroxybenzophenone, 4-(dimethylamino)benzophenone, 3,4-dimethylbenzophenone, 3-hydroxybenzophenone, 4-hydroxybenzophenone, 2-methylbenzophenone, 3-methylbenzophenone, 4-methylbenzophenone, methyl benzoylformate, Michler's ketone, bis(4-tert-butylphenyl)iodonium perfluoro-1-butanesulfonate, bis(4-tert-butylphenyl)iodonium p-toluenesulfonate, bis(4-tert-butylphenyl)iodonium triflate, Boc-methoxyphenyldiphenylsulfonium triflate, (4-bromophenyl) diphenylsulfonium triflate, (tert-Butoxycarbonylmethoxynaphthyl)-diphenylsulfonium triflate, (4-tert-Butylphenyl)diphenylsulfonium triflate, diphenyliodonium hexafluorophosphate, diphenyliodonium nitrate, diphenyliodonium perfluoro-1-butanesulfonate, diphenyliodonium p-toluenesulfonate, diphenyliodonium triflate, (4-fluorophenyl)diphenylsulfonium triflate, N-hydroxynaphthalimide triflate, N-hydroxy-5-norbornene-2,3-dicarboximide perfluoro-1-butanesulfonate, (4-iodophenyl) diphenylsulfonium triflate, (4-methoxyphenyl) diphenylsulfonium triflate, 2-(4-methoxystyryl)-4,6-bis (trichloromethyl)-1,3,5-triazine, (4-methylphenyl)

diphenylsulfonium triflate, (4-methylthiophenyl)methyl phenyl sulfonium triflate, 1-naphthyl diphenylsulfonium triflate, (4-phenoxyphenyl)diphenylsulfonium triflate, (4-Phenylthiophenyl)diphenylsulfonium triflate, triarylsulfonium hexafluoroantimonate salt, triarylsulfonium hexafluorophosphate salt, triphenylsulfonium perfluoro-1-butanesufonate, triphenylsulfonium triflate, tris(4-tert-butylphenyl) sulfonium perfluoro-1-butanesulfonate, tris(4-tert-butylphenyl)sulfonium triflate, anthraquinone-2-sulfonic acid sodium salt monohydrate, 2-tert-butylanthraquinone, camphorquinone, diphenyl(2,4,6-trimethylbenzoyl)phosphine oxide, 9,10-phenanthrenequinone, phenylbis(2,4,6-trimethylbenzoyl)phosphine oxide, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, or thioxanthen-9-one.

Devices Including the Cured Product or Curable Composition.

Various embodiments provide a device including at least one of an embodiment of the curable composition and an embodiment of the cured product of the curable composition. The device can be any suitable device, such as a display, an liquid crystal (LC)-laminate structure, an optical device, an optical component, an optical assembly, an electronic component, an electronic assembly, or an optical electronic component.

In some embodiments, the present invention provides a display including a cured product of the curable silicone composition. The display can be any suitable display, for example, a liquid crystal display (LCD).

In some embodiments, the present invention provides an LC-laminate structure including a cured product of the curable silicone composition. The LC-laminate structure can be any suitable laminate structure including an LC. For example, the LC-laminate structure can be a device assembly representing at least one of a touch screen, a display, a light-modulating thin film, and a smart window. In various embodiments, the cured product of the curable composition can be included in raised features between the laminate layers (e.g., in full or partial replacement of other spacer beads or fibers, with liquid crystals such as smectic or nematic) that substantially isolate one LC cell sandwiched between the laminate layers from one or more other LC cells sandwiched between the laminate layers. The raised feature between the laminate layers can define the thickness of the LC cell, and in various embodiments the high-controllability of the dimensions of cured features (e.g., height) can allow the curable composition to be used to produce LC-laminate structures with increased precision or with greater efficiency than other techniques of generating these structures. The raised feature between the laminate layers can replace conventional spacing technologies for LC, where spacer beads or fibers are added to the liquid crystal material or sprayed onto a surface. The height of the raised feature can be any suitable height, such as about 0.5 microns to about 30 microns, or about 0.5 microns or less, 1 micron, 2, 3, 4, 5, 6, 7, 8, 9, 10, 12, 14, 16, 18, 20, 22, 24, 26, 28, or about 30 microns or more. In some embodiments, a composition including a filler can be used to generate raised features having heights of about 2-30 microns. In some embodiments, a composition not including a filler can be used to generate raised features having heights of about 0.5 microns to about 20 microns. A transparent conductive layer, such as indium tin oxide, can be included on the laminate-materials to form electrodes used to apply an electrical current or electric field to an LC cell.

In some embodiments, the present invention provides a device including a cured product of the curable silicone composition. In some embodiments, the cured product is used as a process aid, for example the cured product can form raised features or stand-offs that prevent manufactured devices from fully contacting one another during a manufacturing process. In some embodiments, the cured product is functional, and forms an aspect of a device that can be optically functional or non-optically functional. The cured product of the curable composition can be a 3D printed feature or a 3D printed device. The cured product can be the object of manufacture in additive manufacturing, such as a macroscopic free-standing form or as part of such. The device can be a liquid crystal device, such as a light modulator, a light diffuser (e.g., to re-direct light, such as to provide opacity which can provide a privacy function), a touch screen (e.g., a transparent electrical device or switch).

In some embodiments, the device including a cured product of the curable silicone composition is an optical device. The optical device can be any optical device. For example, the cured product can form or can be included in a lens or a waveguide. The cured product can be part of a window, smart window, or a diffuser. In some examples, the cured product can encapsulate another component. For example, the cured product can encapsulate semiconductor materials to form an LED or OLED or another light-emitting or light-absorbing semiconductor component. The cured product can form any part of the optical device through which light passes, either with or without modification or manipulation of the light. The cured product can be part of an optical integrated circuit, such as integrated circuits, such as part of an attenuator, switch, splitter, router, filter, or grating.

Method of Printing or Spraying.

In various embodiments, the present invention provides a method of printing or spraying. The method can include printing or spraying an embodiment of the curable silicone composition onto a substrate. The substrate can be any suitable substrate. In some embodiments, the substrate can be at least one of transparent and conductive (e.g., fully conductive, or including conductive portions). The method can also include curing the composition, to provide a substrate having cured printed or sprayed features thereon. The cured composition can include three-dimensional and substantially optically transparent printed features. The printed feature can be used to maintain a desired separation between two adjacent substrates.

The spraying technique can be any suitable spraying technique, such as jet spraying. The printing technique can be any suitable printing technique, and can include coating techniques. For example, the printing of the composition onto the substrate can include at least one of offset printing, screen printing (e.g., roll-to-roll), flexographic printing, inkjet printing, laser printing, dot matrix printing, daisy wheel printing, pad printing, relief printing, rotogravure printing, gravure printing, jet printing, ultrasonic spray printing, piezoelectric printing, and three dimensional (3D) printing (e.g., the substrate is printed composition which can optionally be cured, or the substrate is a surface on which the 3D printed object rests). In some embodiments, the fast UV-cure time of the composition can allow rapid printing and solidification of features such that the printed material can be safe to roll up or otherwise handle; for example, in some embodiments, the method can be used to conduct roll-to-roll printing at about 1 m/min or less, or about 2 m/min, 3, 4, 5, 10, 15, 20, 25, 30, 35, 40, 45, 50, 55, 60, 90, 120, 150, 200, 250, 300, 350, 400, 450, or about 500 m/min.

In some embodiments, the printing of the composition onto the substrate can include at least one of screen printing and flexographic printing. In various embodiments, the composition can be tuned to provide a rheological profile that is compatible with a desired printing technique. For example, a yield stress can be used to prevent flow until the required time, shear-thinning can facilitate the delivery of the material to the surface, and low hysteresis can allow rapid recovery of viscosity to prevent significant slump of printed features prior to cure.

In some embodiments, the substrate can be treated to improve adhesion of the composition onto the substrate. In some examples the surface of the substrate can be modified prior to the application of the composition, such as via treatment with corona or plasma, to improve adhesion between the composition and the substrate. In some examples, the surface of the substrate can be treated with a coupling agent (e.g., an adhesion promoter), such as any suitable agent that adheres effectively to the substrate and to the composition, such that the bond between the composition and the substrate is enhanced via the coupling of the coupling agent as compared to the bond that would occur between the composition and the substrate in the absence of the coupling agent. In some embodiments, the composition can include a coupling agent.

In some embodiments, the composition can be uniquely useful as a material or additive for 3D printing. When embodiments of the composition are 3D-printed and cured, the cured product can form a 3D printed feature that has suitable thermal tolerance, strength, and optical transparency for a variety of applications.

EXAMPLES

Various embodiments of the present invention can be better understood by reference to the following Examples which are offered by way of illustration. The present invention is not limited to the Examples given herein.

Example 1. Preparation of Component (A)

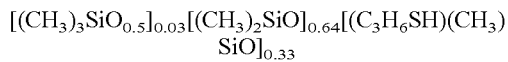

De-ionized water (354 g) was added to a 1 L 3-neck flask equipped with a mechanical stirrer, thermocouple, and addition funnel. The flask was cooled with an ice/water bath. A pre-mixture of silanes and toluene was made by adding 140 g of $Me_2SiCl_2$, 100.9 g of $Me(HSCH_2CH_2CH_2)Si(OMe)_2$, 5.53 g of $Me_3SiCl$, and 160 g of toluene to a bottle and shaking the bottle well. The pre-mixture was added through an addition funnel to the reaction flask with stirring at 300 rpm while keeping the temperature below 40° C. over a time period of 15 minutes. Stirring was conducted at 89° C. (reflux) for 30 minutes. The mixture was transferred to a separation funnel and the two phases were allowed to separate. The bottom phase was drained. The upper phase was washed with 300 g of DI water three times at 25° C., and pH 4.5 was reached. The solution was poured back to the reactor, 0.9 g Dowex 2030 acid catalyst was added, and the solution was heated at reflux for one hour, during which water was removed via a Dean Stark trap. The clear solution was filtered through a 1 micron glass fiber filter paper under vacuum. Most solvent was removed using a rotary evaporator at 80° C., followed by stripping under 1 torr at 120° C. for 1 hour. 142 g of clear liquid was obtained.

Example 2. Preparation of 1-Part UV-Curable Silicone Compositions

UV-curable silicone composition examples Ex 2-1 through C Ex 2-8 were made by mixing the components specified in the Table 1 in a dental cup for 1 minute at 3500 rpm on a dental mixer. The samples Ex 2-1 through Ex 2-5 were optically clear and homogeneous liquids, Ex 2-6 was an optically clear and homogeneous paste, Ex 2-7 was a white and homogeneous paste, and Ex 2-8 was a black and homogeneous paste. UV radiation tests were conducted using a SPDI UV Power-Shot system. Five drops of each sample were placed on a glass slide, and were exposed to the UV radiation with a dosage of ca. 500 $mJ/cm^2$. After radiation, samples were poked with a plastic pipet to see if they were cured.

TABLE 1

Preparation of 1-part UV-curable silicone compositions. MviTvi stands for $[(CH_2=CH)Me_2SiO_{1/2}]_{0.34}[(CH_2=CH)SiO_{3/2}]_{0.66}$ resin, HMPP stands for 2-hdroxy-2-methylpropiophenone, D4(Vi) stands for $[(CH_2=CH)MeSiO_{1/2}]_4$, F $SiO_2$ stands for fumed silica with an average primary particle size of 17 nm, ZnO stands for a zinc oxide filler with an average primary particle size of 100 nm, and Nano C stands for an activated carbon with a primary particle size of 20-40 nm.

| Ex | (A) | Parts (A) | (B) | Parts (B) | (C) | Parts (C) | (D) | Parts (D) | SH/Vi | Initial Appearance | Post-UV radiation appearance |
|---|---|---|---|---|---|---|---|---|---|---|---|
| Ex 2-1 | Ex 1 | 1 | MviTvi | 0.29 | — | — | HMPP | 0.026 | 1 | Clr liquid | Clr, rigid solid |
| Ex 2-2 | Ex 1 | 1 | MviTvi | 0.29 | — | — | HMPP | 0.013 | 1 | Clr liquid | Clr, rigid solid |
| Ex 2-3 | Ex 1 | 1 | MviTvi | 0.145 | — | — | HMPP | 0.023 | 2 | Clr liquid | Clr, rigid solid |
| Ex 2-4 | Ex 1 | 1 | MviTvi | 0.58 | — | — | HMPP | 0.032 | 0.5 | Clr liquid | Clr, rigid solid |

TABLE 1-continued

Preparation of 1-part UV-curable silicone compositions. MviTvi stands
for $[(CH_2=CH)Me_2SiO_{1/2}]_{0.34}[(CH_2=CH)SiO_{3/2}]_{0.66}$ resin, HMPP
stands for 2-hdroxy-2-methylpropiophenone, D4(Vi) stands for
$[(CH_2=CH)MeSiO_{1/2}]_4$, F $SiO_2$ stands for fumed silica with
an average primary particle size of 17 nm, ZnO stands for a
zinc oxide filler with an average primary particle size of
100 nm, and Nano C stands for an activated carbon
with a primary particle size of 20-40 nm.

| Ex | (A) | Parts (A) | (B) | Parts (B) | (C) | Parts (C) | (D) | Parts (D) | SH/Vi | Initial Appearance | Post-UV radiation appearance |
|---|---|---|---|---|---|---|---|---|---|---|---|
| Ex 2-5 | Ex 1 | 1 | D4(Vi) | 0.30 | — | — | HMPP | 0.026 | 1 | Clr liquid | Clr, rigid solid |
| Ex 2-6 | Ex 1 | 1 | MviTvi | 0.29 | F $SiO_2$ | 0.086 | HMPP | 0.026 | 1 | Clr paste | Clr, rigid solid |
| C Ex 2-7 | Ex 1 | 1 | MviTvi | 0.29 | ZnO | 2.65 | HMPP | 0.057 | 1 | Wht paste | Not cured |
| C Ex 2-8 | Ex 1 | 1 | MviTvi | 0.29 | Nano C | 0.47 | HMPP | 0.057 | 1 | Blk paste | Not cured |

Example 3. Preparation of Part I of Shear-Thinning and UV-Curable Silicone Compositions Component C, fumed silica (0.2-0.3 micron in aggregate size, Aldrich), was added to Component A formed in Example 1 in a 4-liter ROSS mixer in four portions, and was mixed in by mixing at 50 rpm for 10 minutes after each addition. The resulting coarse powder mixture was mixed again at 60 rpm in vacuum (28 inch Hg) at 120° C. for 2.5 hours, scraped well, and mixed again at 60 rpm in vacuum (28 inch Hg) at 25° C. for 0.5 hours, resulting in a homogeneous viscous fluid or paste. Component D was then added and mixed at 25° C. under a slow nitrogen stream for 0.5 hour to yield a sample of Part I of shear thinning and UV-curable siloxane ink suitable for screen or flexographic printing. The results are shown in Table 2.

TABLE 2

Preparation of Part I of shear-thinning
and UV-curable silicone compositions.

| Ex | (A) | Parts (A) | (C) | Parts (C) | (D) | Parts (D) | Appearance |
|---|---|---|---|---|---|---|---|
| Ex 3-1 | Ex 1 | 1 | F $SiO_2$ | 0.23 | HMPP | 0.013 | Viscous fluid |
| Ex 3-2 | Ex 1 | 1 | F $SiO_2$ | 0.44 | HMPP | 0.039 | Paste or gum |

Example 4. Preparation of Shear-Thinning and UV-Curable Silicone Compositions from Part I and Part II Part I and Part II were weighed into a container and mixed according to Table 3.

TABLE 3

Preparation of shear-thinning and UV-curable silicone
compositions from Part I and Part II.

| Ex | Part I | Parts (Part I) | Part II | Parts (Part II) | Mixing method | Ink sample appearance. |
|---|---|---|---|---|---|---|
| Ex 4-1 | Ex 3-1 | 1 | MviTvi | 0.243 | Stirring with a spatula and shaking by hand | Clear and viscous fluid |
| Ex 4-2 | Ex 3-2 | 1 | MviTvi | 0.195 | Large samples (ca. 400 g): Mixing with INDCO HS Series Dispenser equipped with a 4" blade for 20 min; Small samples (ca. 20 g): Mixing in Max 20 dental cup on SpeedMixeer DAC 150 FVZ-K at 3500 rpm for 2 min. | Clear paste |

Figure 1B:
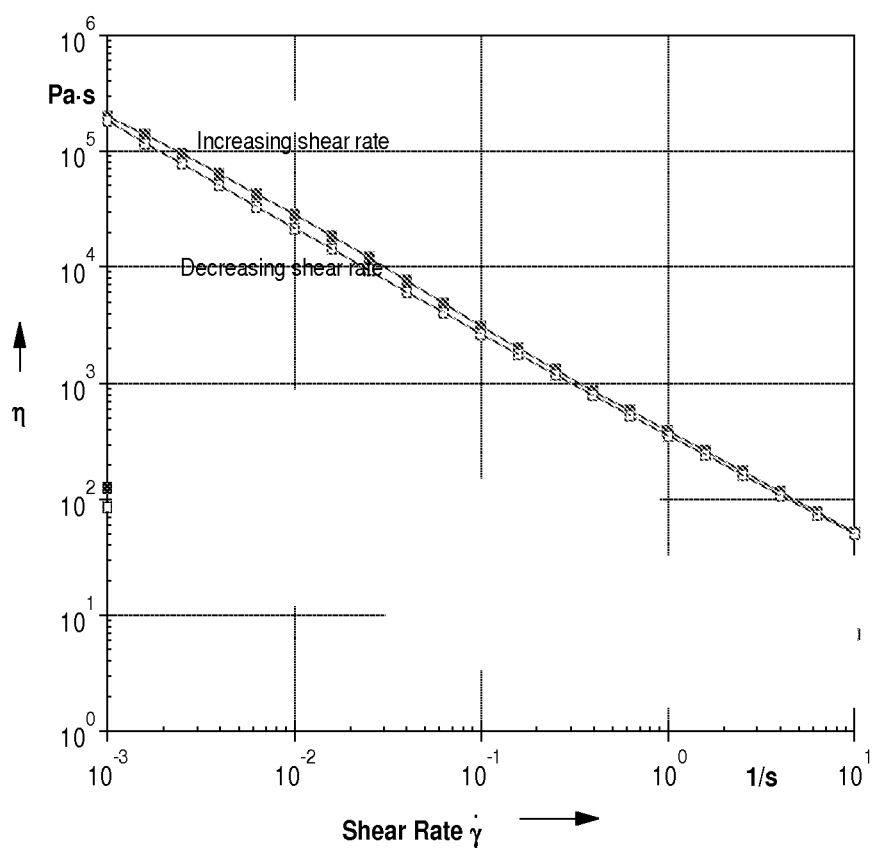
FIG. 1b illustrates the viscosity versus shear rate of a curable silicone composition, in accordance with various embodiments.
Figures 2A, 2B, 2C, 2D:
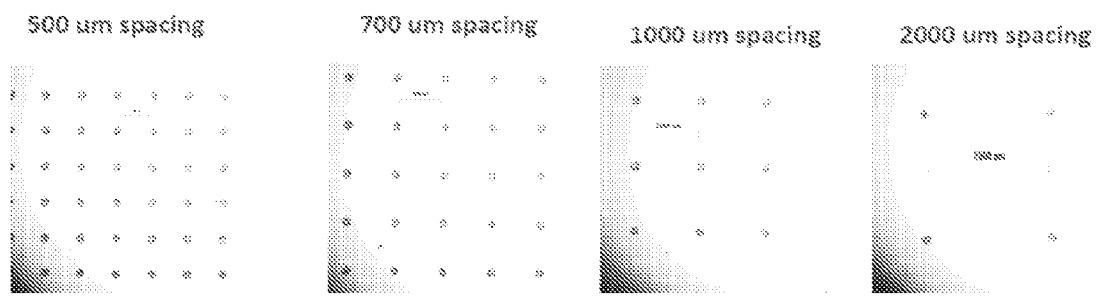
FIGS. 2a-2d illustrate optical microscopy images of cured roll-to-roll screen printed features having spacings of 500, 700, 1000, and 2000 microns, respectively, in accordance with various embodiments.

Viscosity versus shear rate of curable compositions 4-1 and 4-2 are shown in FIGS. 1a and 1b, respectively. About 12 grams of Ex 4-1 was poured to an aluminum Disposable Sample Chamber made by Brookfield (HT-2DB), and the sample chamber was inserted into a HT-60 ADCP Thermo Container that was controlled at 25° C. A Brookfield spindle 34 was installed, and the sample chamber was allowed to sit in the thermo container for 10 minutes to equilibrate, before testing. The steady shear rate viscosity was tested sequentially at rotation speeds of 0.01, 0.02, 0.04, 0.08, 0.16, 0.32, 0.64, 1.25, 2.5 and 5 rpm. At each speed, the spindle was rotated for about 30 seconds to achieve a steady viscosity reading. The viscosity data was plotted against shear rate using the Brookfield rotation speed to shear rate conversion factor, which was 0.28 times rotation speed, as shown in FIG. 1a. The steady shear rate viscosity of Ex 4-2 was tested on an Anton Paar MCR 302 Rheometer with control software Rheoplus Ver. 3.61. A traceable NIST SRM2490 standard was used to check calibration. Tests were done using 25 mm parallel plates with a gap of 0.5 mm at 25 C in the shear rate range of $10^{-3}$ to $10^1$ sec$^{-1}$. The sample was allowed to relax for at least 2 minutes on the rheometer before commencing the shear rate sweep. Because of limited torque sensitivity and flow instability resulting from rotational inertia, reliable data was not obtained below and above these shear rate, respectively. The increasing shear rate sweep was followed immediately by the decreasing shear rate sweep. As shown by FIG. 1b, the increasing shear rate curve highlights the shear-thinning or thixotropy of the material. Additionally, the decreasing shear rate curve shows that the viscosity recovers very rapidly. This is indicates that the viscosity of the material in a printed feature builds rapidly, reducing the extent of spreading on the surface, allowing the printed feature to largely retain its shape prior to UV cure. It can also benefit the printing process, for example after transferring the paste to a printing screen the viscosity can recover and prevent dripping through the screen—the material doesn't pass through the screen until the squeegee applies shear to transfer it to the substrate. The area between the two curves defines a small hysteresis area.

Example 5. Printing UV-Curable Silicone Compositions Using Bench-Top Flexographic Printer Samples Ex 2-1 and Ex 2-6 were tested as flexographic inks on an IGT-F1 Printability Tester. The tester consisted of an inking section and a printing section. The inking section had an engraved anilox roller and a doctor blade, and the printing section had a printing cylinder with a flexo printing plate attached and an impression cylinder. A piece of indium tin oxide/polyethylene terephthalate (ITO/PET) substrate was attached to a carrier and placed on the substrate guide, between the printing cylinder and the impression cylinder. When the F1 was activated, the anilox disc and the substrate came into contact with the printing form, and the doctor blade contacted the anilox. A few drops of ink sample were applied to the nip between the doctor blade and the anilox, excess ink was wiped off by the doctor blade and a controlled amount ink was transferred from the anilox disc to the printing plate on the printing cylinder and from the printing plate to the substrate. The doctor blade, anilox disc and impression cylinder were then lifted automatically. The print sample was then immediately radiated with an UV lamp. The results are shown in Table 4.

TABLE 4

Printing UV-curable silicone compositions using bench-top flexographic printer.

| Ex | Ink sample | Print results |
|---|---|---|
| Ex 5-1 | Ex 2-6 | Minimum ink spreading and well-defined printed dots |
| C Ex 5-2 | Ex 2-1 | Severe ink spreading and large printed dots |

Example 6. Printing UV-Curable Silicone Compositions Using Roll-to-Roll Flexographic Printing Sample Ex 4-1 was tested as a flexographic ink on a Timsons Ltd. T-Flex 600 platform (600 mm web width). The substrate used was bi-axially oriented polypropylene film. A segmented anilox roller was used that reduced the swathe printed to around 100 mm. A selection was made of the anilox volume to be of a median value suitable for thick ink transferred features. This volume was 18 cc/m$^2$ for these trials. The runs went smoothly at diverse speeds up to 30 meters per minute with full cure, and excellent pattern transfer.

Example 7. Printing UV-Curable Silicone Compositions Using Roll-to-Roll Screen Printing Sample EX 4-2 was tested for roll-to-roll screen printing trials using a 20 inch wide flat bed screen print press manufactured by Kinzel. Solutia ITO/PET of 16" in width, 5 mil in thickness and 100 ohms/sq in resistivity was used. The line speed was 15 fpm, and the UV lamp power setting was 50%. The screen was made of a 325 threads per inch stainless steel mesh with a photo polymer, and the cells were a matrix of dots of 100 micron in diameter and 500, 700, 1000, and 2000 microns in spacing. The print samples (Ex 7-1) were ITO/PET films having rigid and transparent dots of 135 micron in diameter and 17 micron in height according to white light interferometer measurements.

Optical microscopy of the samples having 500, 700, 1000, and 2000 microns spacing are shown in FIGS. 2a-d, respectively.

Figure 3:
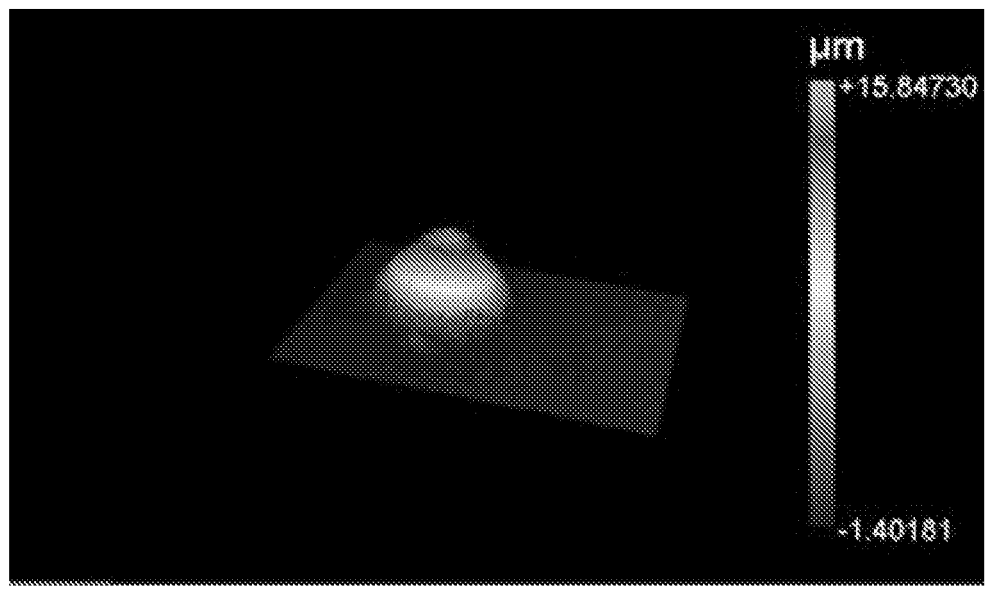
FIG. 3 illustrates a white light interferometry image of a cured printed feature generated using 500 micron spacing, in accordance with various embodiments.

FIG. 3 illustrates a white light interferometry image of a cured printed feature from the sample generated using 500 micron spacing.

Example 8. Use of Printed UV-Curable Silicone Composition as Spacers for Making Thin Films with Controlled Thickness Sample Ex 7-1 can be used to make thin films between ITO/PET substrates with controlled thickness. As an example (Ex 8-1), a thin film of a Smectic A liquid crystal of 17 micron in thickness was made between a piece of Ex 7-1 and a piece of Solutia ITO (5 mil in thickness) by using a Cheminstruments HL-100 Hot Roll Laminator.

A device fabricated in this way was shown to operate as an electro-optic device, being switched between clear and scattering states. The presence of the printed spacers did not impede the electro-optic switching performance, or the optical quality to the clear and scattering states. Transmission and haze data, determined using a BYK Gardner Hazegard Plus instrument was 82.0% light transmission and 3.7% haze for the clear state of the device; and 78.0% light transmission and 98.0% haze for the scattering state of the device.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a composition comprising:

(A) a mercapto-functional polyorganosiloxane having the unit formula

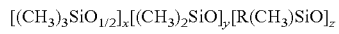

wherein x is about 0.01 to about 0.1, y is about 0 to about 0.94, z is about 0.05 to about 0.99, and at each occurrence R is independently a mercapto($C_{1-30}$)hydrocarbyl group;

(B) at least one of (B1) a polyorganosiloxane comprising at least two aliphatic unsaturated carbon-carbon bonds, and (B2) an organic molecule comprising at least two aliphatic unsaturated carbon-carbon bonds;

(C) a filler; and (D) a photoinitiator;

wherein the composition is shear-thinning and UV-curable.

Embodiment 2 provides the curable silicone composition of Embodiment 1, wherein x is about 0.02 to about 0.05, y is about 0 to about 0.9, and z is about 0.08 to about 0.98.

Embodiment 3 provides the curable silicone composition of any one of Embodiments 1-2, wherein x is about 0.025 to about 0.04, y is about 0.4 to about 0.8, and z is about 0.2 to about 0.4.

Embodiment 4 provides the curable silicone composition of any one of Embodiments 1-3, wherein the mercapto-functional polyorganosiloxane has the unit formula

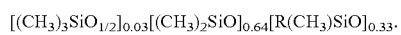

Embodiment 5 provides the curable silicone composition of any one of Embodiments 1-4, wherein at each occurrence R is independently a mercapto($C_1$-$C_{30}$)alkyl group.

Embodiment 6 provides the curable silicone composition of any one of Embodiments 1-5, wherein at each occurrence R is independently a mercapto($C_1$-$C_{10}$)alkyl group.

Embodiment 7 provides the curable silicone composition of any one of Embodiments 1-6, wherein at each occurrence R is HS—$(CH_2)_3$—.

Embodiment 8 provides the curable silicone composition of any one of Embodiments 1-7, wherein the ratio of mercapto groups in the mercapto-functional polysiloxane to the number of aliphatic unsaturated carbon-carbon bonds in component (B) is about 0.25 to about 4.

Embodiment 9 provides the curable silicone composition of any one of Embodiments 1-8, wherein the silicone composition has a wt % of the mercapto-functional polysiloxane of about 25 wt % to about 90 wt %.

Embodiment 10 provides the curable silicone composition of any one of Embodiments 1-9, wherein the silicone composition has a wt % of the mercapto-functional polysiloxane of about 50 wt % to about 85 wt %.

Embodiment 11 provides the curable silicone composition of any one of Embodiments 1-10, wherein the polyorganosiloxane comprising at least two aliphatic unsaturated carbon-carbon bonds comprises at least one of vinyl($C_1$-$C_5$)alkyl-$SiO_{1/2}$ units and vinyl$SiO_{3/2}$ units.

Embodiment 12 provides the curable silicone composition of any one of Embodiments 1-11, wherein the polyorganosiloxane comprising at least two aliphatic unsaturated carbon-carbon bonds is $[(CH_2=CH)Me_2SiO_{1/2}]_{0.1-1}$ $[(CH_2=CH)SiO_{3/2}]_{0-0.9}$.

Embodiment 13 provides the composition of any one of Embodiments 1-12, wherein the polyorganosiloxane comprising at least two aliphatic unsaturated carbon-carbon bonds is chosen from the unit formula $[(CH_2=CH)Me_2SiO_{1/2}]_{0.34}[(CH_2=CH)SiO_{3/2}]_{0.66}$ and the structure $[(CH_2=CH)MeSiO_{1/2}]_4$.

Embodiment 14 provides the curable silicone composition of any one of Embodiments 1-13, wherein the organic molecule comprising at least two aliphatic unsaturated carbon-carbon bonds is a ($C_5$-$C_{20}$)alkyl-diene or -triene.

Embodiment 15 provides the composition of any one of Embodiments 1-14, wherein the organic molecule comprising at least two aliphatic unsaturated carbon-carbon bonds is a ($C_5$-$C_{20}$)alkyl-diene or -triene.

Embodiment 16 provides the composition of any one of Embodiments 1-15, wherein the silicone composition has a wt % of the Component (B) of about 5 wt % to about 75 wt %.

Embodiment 17 provides the composition of any one of Embodiments 1-16, wherein the silicone composition has a wt % of the Component (B) of about 10 wt % to about 60 wt %.

Embodiment 18 provides the curable silicone composition of any one of Embodiments 1-17, wherein the filler is at least one of silica powder and ceramic glass powder.

Embodiment 19 provides the curable silicone composition of Embodiment 18, wherein the silica powder is at least one of fumed silica, precipitated silica, and quartz.

Embodiment 20 provides the curable silicone composition of any one of Embodiments 18-19, wherein the ceramic glass powder is at least one of soda-lime glass, low iron glass, and borosilicate glass.

Embodiment 21 provides the curable silicone composition of any one of Embodiments 1-20, wherein the filler (C) is fumed silica.

Embodiment 22 provides the curable silicone composition of any one of Embodiments 1-21, wherein the filler has a primary particle size of about 5 nm to about 100 nm.

Embodiment 23 provides the curable silicone composition of any one of Embodiments 1-22, wherein the filler has a primary particle size of about 10 to about 30 nm.

Embodiment 24 provides the curable silicone composition of any one of Embodiments 1-23, wherein the filler has a refractive index that substantially matches a refractive index of a mixture of components (A), (B), and (D).

Embodiment 25 provides the curable silicone composition of any one of Embodiments 1-24, wherein the filler has a refractive index of about 1.43 to about 1.55 at 633 nm at standard temperature and pressure.

Embodiment 26 provides the curable silicone composition of any one of Embodiments 1-25, wherein the filler has a refractive index of about 1.44 to about 1.48 at 633 nm at standard temperature and pressure.

Embodiment 27 provides the curable silicone composition of any one of Embodiments 1-26, wherein the filler is substantially transparent to light having a wavelength of about 280 nm to about 400 nm.

Embodiment 28 provides the curable silicone composition of any one of Embodiments 1-27, wherein the silicone composition has a wt % of the filler of about 0.01 wt % to about 50 wt %.

Embodiment 29 provides the curable silicone composition of any one of Embodiments 1-28, wherein the silicone composition has a wt % of the filler of about 1 wt % to about 40 wt %.

Embodiment 30 provides the curable silicone composition of any one of Embodiments 1-29, wherein the photoinitiator comprises at least one of a benzoin ether, a benzyl ketal, an α-dialkoxyacetophenone, an α-hydroxyalkylphenones, an α-aminoalkylphenones, an acyl-phosphine oxide, a benzophenone, a benzoamine, a thioxanthone, a thioamine, and a titanocene.

Embodiment 31 provides the curable silicone composition of any one of Embodiments 1-30, wherein the photoinitiator comprises 2-hydroxy-2-methyl-1-phenyl-1-propanone (HMPP).

Embodiment 32 provides the curable silicone composition of any one of Embodiments 1-31, wherein the silicone composition has a wt % of the photoinitiator of about 0.1 wt % to about 15 wt %.

Embodiment 33 provides the curable silicone composition of any one of Embodiments 1-32, wherein the silicone composition has a wt % of the photoinitiator of about 0.5 wt % to about 5 wt %.

Embodiment 34 provides the curable silicone composition of any one of Embodiments 1-33, wherein the curable silicone composition is substantially optically clear.

Embodiment 35 provides the curable silicone composition of any one of Embodiments 1-34, wherein the curable composition has a refractive index of about 1.43 to about 1.55 at 633 nm at standard temperature and pressure.

Embodiment 36 provides the curable silicone composition of any one of Embodiments 1-35, wherein the curable composition has a refractive index of about 1.44 to about 1.48 at 633 nm at standard temperature and pressure.

Embodiment 37 provides the curable silicone composition of any one of Embodiments 1-36, wherein the viscosity of the composition decreases as the shear rate increases.

Embodiment 38 provides a method of making the curable silicone composition of any one of Embodiments 1-37, the method comprising obtaining or providing Part I, comprising a substantially viscosity-stable pre-mix comprising the components (A), (C), and (D);
obtaining or providing Part II, comprising component (B); and
mixing Part I and Part II, to form the composition of Embodiment 1.

Embodiment 39 provides the method of Embodiment 38, comprising mixing component (A) and component (C) with heating under a vacuum.

Embodiment 40 provides a cured product of the composition of any one of Embodiments 1-37.

Embodiment 41 provides the cured product of Embodiment 40, wherein the cured product is optically substantially clear.

Embodiment 42 provides the cured product of any one of Embodiments 40-41, wherein the cured product has a refractive index of about 1.43 to about 1.55 at 633 nm at standard temperature and pressure.

Embodiment 43 provides the cured product of any one of Embodiments 40-42, wherein the cured product has a refractive index of about 1.44 to about 1.48 at 633 nm at standard temperature and pressure.

Embodiment 44 provides a display comprising the cured product of any one of Embodiments 40-43.

Embodiment 45 provides an LC-laminate structure comprising the cured product of any one of Embodiments 40-43.

Embodiment 46 provides the LC-laminate structure of Embodiment 45, wherein the LC-laminate structure is at least one of a touch screen, a display, a light-modulating thin film, and a smart window.

Embodiment 47 provides a device comprising the cured product of any one of Embodiments 40-43.

Embodiment 48 provides the device of Embodiment 47, wherein the device is an optical device.

Embodiment 49 provides the optical device of Embodiment 48, wherein the optical device comprises at least one of a lens, a waveguide, a window, a smart window, a diffuser, and an encapsulated semiconductor.

Embodiment 50 provides a method comprising:
printing or spraying the composition of any one of Embodiments 1-37 onto a substrate; and
curing the composition.

Embodiment 51 provides the method of Embodiment 50, wherein the printing of the composition onto the substrate comprises at least one of offset printing, screen printing, flexographic printing, inkjet printing, laser printing, dot matrix printing, daisy wheel printing, pad printing, relief printing, rotogravure printing, gravure printing, jet printing, ultrasonic spray printing, piezoelectric printing, and 3D printing.

Embodiment 52 provides the method of any one of Embodiments 50-51, wherein the printing of the composition onto the substrate comprises at least one of screen printing and flexographic printing.

Embodiment 53 provides the method of any one of Embodiments 50-52, wherein the cured composition comprises three-dimensional and optically transparent printed features.

Embodiment 54 provides a method of ink-jet printing, comprising:
obtaining or providing a printable composition comprising
(A) a mercapto-functional polyorganosiloxane having the unit formula

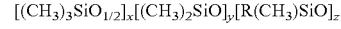

$[(CH_3)_3SiO_{1/2}]_x[(CH_3)_2SiO]_y[R(CH_3)SiO]_z$ wherein x is about 0.01 to about 0.1, y is about 0 to about 0.94, z is about 0.05 to about 0.99, and at each occurrence R is independently a mercapto($C_{1-30}$)hydrocarbyl group;
(B) at least one of
(B1) a polyorganosiloxane comprising at least two aliphatic unsaturated carbon-carbon bonds, and
(B2) an organic molecule comprising at least two aliphatic unsaturated carbon-carbon bonds;
(D) a photoinitiator;
printing the printable composition onto a substrate with an ink-jet printer; and
curing the printed printable composition.

Embodiment 55 provides the method of Embodiment 54, wherein the substrate is optically transparent and electrically conductive.

Embodiment 56 provides a composition comprising:
(A) a mercapto-functional polyorganosiloxane having the unit formula

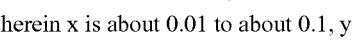

$[(CH_3)_3SiO_{1/2}]_x[(CH_3)_2SiO]_y[R(CH_3)SiO]_z$ wherein x is about 0.01 to about 0.1, y is about 0 to about 0.94, z is about 0.05 to about 0.99, and at each occurrence R is a mercaptopropyl group, and wherein Component (A) is present in the composition at about 40 wt % to about 85 wt %;
(B) at least one of
(B1) a polyorganosiloxane comprising at least two aliphatic unsaturated carbon-carbon bonds, and
(B2) an organic molecule comprising at least two aliphatic unsaturated carbon-carbon bonds,
wherein Component (B) is present in the composition at about 10 wt % to about 60 wt %;
(C) a filler comprising fumed silica having a primary particle size of about 5 to about 100 nm, wherein the filler is substantially transparent to light having a wavelength of about 280 nm to about 400 nm, the filler has a refractive index of about 1.44 to about 1.48 and 633 nm at standard temperature and pressure, and wherein Component (C) is present in the composition at about 1 wt % to about 40 wt %; and (D) a UV photoinitiator, wherein Component (D) is present in the composition at about 0.5 wt % to about 5 wt %;

wherein the composition is shear-thinning and UV-curable, and the composition has a refractive index of about 1.44 to about 1.48 and 633 nm at standard temperature and pressure.

Embodiment 57 provides a cured product of the composition of Embodiment 56.

Embodiment 58 provides the apparatus, method, composition, or system of any one or any combination of Embodiments 1-57 optionally configured such that all elements or options recited are available to use or select from.

What is claimed is:

1. A composition comprising:
   (A) a mercapto-functional polyorganosiloxane having the unit formula

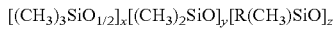
   $[(CH_3)_3SiO_{1/2}]_x[(CH_3)_2SiO]_y[R(CH_3)SiO]_z$ wherein x is about 0.01 to about 0.1, y is about 0 to about 0.94, z is about 0.05 to about 0.99, and at each occurrence R is independently a mercapto($C_{1-30}$) hydrocarbyl group;
   (B) at least one of
      (B1) a polyorganosiloxane comprising at least two aliphatic unsaturated carbon-carbon bonds, and
      (B2) an organic molecule comprising at least two aliphatic unsaturated carbon-carbon bonds;
   (C) a filler, where the filler is present in 20 wt. % or more based on the weight of the composition; and
   (D) a photoinitiator;
   wherein the composition is shear-thinning and UV-curable.

2. The curable silicone composition of claim 1, wherein the filler is at least one of silica powder and ceramic glass powder.

3. The curable silicone composition of claim 1, wherein the filler (C) is fumed silica.

4. The curable silicone composition of claim 1, wherein the filler is substantially transparent to light having a wavelength of about 280 nm to about 400 nm.

5. The curable silicone composition of claim 1, wherein the curable silicone composition is substantially optically clear.

6. The curable silicone composition of claim 1, wherein the viscosity of the composition decreases as the shear rate increases.

7. A method of making the curable silicone composition of claim 1, the method comprising
   obtaining or providing Part I, comprising a substantially viscosity-stable pre-mix comprising the components (A), (C), and (D);
   obtaining or providing Part II, comprising component (B); and
   mixing Part I and Part II, to form the composition of claim 1.

8. A cured product of the composition of claim 1.

9. The cured product of claim 8, wherein the cured product is optically substantially clear.

10. A device comprising the cured product of claim 9.

11. The device of claim 10, wherein the device is an optical device.

12. The optical device of claim 11, wherein the optical device comprises at least one of a lens, a waveguide, a window, a smart window, a diffuser, and an encapsulated semiconductor.

13. A method comprising:
    printing or spraying the composition of claim 1 onto a substrate; and
    curing the composition.

14. A method of ink-jet printing, comprising:
    obtaining or providing a printable composition comprising
    (A) a mercapto-functional polyorganosiloxane having the unit formula

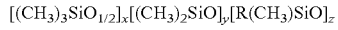
    $[(CH_3)_3SiO_{1/2}]_x[(CH_3)_2SiO]_y[R(CH_3)SiO]_z$ wherein x is about 0.01 to about 0.1, y is about 0 to about 0.94, z is about 0.05 to about 0.99, and at each occurrence R is independently a mercapto($C_{1-30}$) hydrocarbyl group;
    (B) at least one of
       (B1) a polyorganosiloxane comprising at least two aliphatic unsaturated carbon-carbon bonds, and
       (B2) an organic molecule comprising at least two aliphatic unsaturated carbon-carbon bonds;
    (C) a filler, where the filler is present in 20 wt. % or more, based on the weight of the composition; and
    (D) a photoinitiator;
    printing the printable composition onto a substrate with an ink-jet printer; and
    curing the printed printable composition.

15. A composition comprising:
    (A) a mercapto-functional polyorganosiloxane having the unit formula

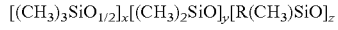
    $[(CH_3)_3SiO_{1/2}]_x[(CH_3)_2SiO]_y[R(CH_3)SiO]_z$ wherein x is about 0.01 to about 0.1, y is about 0 to about 0.94, z is about 0.05 to about 0.99, and at each occurrence R is a mercaptopropyl group, and wherein Component (A) is present in the composition at about 40 wt % to about 85 wt %;
    (B) at least one of
       (B1) a polyorganosiloxane comprising at least two aliphatic unsaturated carbon-carbon bonds, and
       (B2) an organic molecule comprising at least two aliphatic unsaturated carbon-carbon bonds,
       wherein Component (B) is present in the composition at about 10 wt % to about 60 wt %;
    (C) a filler comprising fumed silica having a primary particle size of about 5 to about 100 nm, wherein the filler is substantially transparent to light having a wavelength of about 280 nm to about 400 nm, the filler has a refractive index of about 1.44 to about 1.48 and 633 nm at standard temperature and pressure, and wherein Component (C) is present in the composition at about 20 wt % to about 40 wt %; and
    (D) a UV photoinitiator, wherein Component (D) is present in the composition at about 0.5 wt % to about 5 wt %;
    wherein the composition is shear-thinning and UV-curable, and the composition has a refractive index of about 1.44 to about 1.48 and 633 nm at standard temperature and pressure.

16. A cured product of the composition of claim 15.

* * * * *